March 8, 1966 W. C. McGAUGHEY 3,239,801
LIQUID LENS ULTRASONIC BEAM CONTROLLING DEVICE
Original Filed Jan. 6, 1959 2 Sheets-Sheet 1

March 8, 1966 W. C. McGAUGHEY 3,239,801
LIQUID LENS ULTRASONIC BEAM CONTROLLING DEVICE Original Filed Jan. 6, 1959 2 Sheets-Sheet 2

United States Patent Office 3,239,801
Patented Mar. 8, 1966

3,239,801
LIQUID LENS ULTRASONIC BEAM CONTROLLING DEVICE
William C. McGaughey, New Fairfield, Conn., assignor to Automation Industries, Inc., El Segundo, Calif., a corporation of California
Continuation of application Ser. No. 785,218, Jan. 6, 1959. This application Dec. 18, 1964, Ser. No. 419,336
12 Claims. (Cl. 340—10)

The present invention relates to means for producing ultrasonic energy and more particularly to adjustable means for selectively focusing ultrasonic energy into a beam of any desired shape.

This application is a continuation of co-pending application "Liquid Lens Ultrasonic Beam Controlling Device," S.N. 785,218, filed January 6, 1959 in the name of William C. McGaughey.

At the present time it is frequently desirable to transmit ultrasonic energy into a material for inspecting, testing and/or measuring the material. One means of accomplishing this is to employ a transducer having a mechanically vibratable member which may be interconnected with a source of electrical signals such as an oscillator that operates in the ultrasonic region. The transducer will thereby radiate ultrasonic energy. If the transducer is acoustically coupled to a test specimen the radiated ultrasonic energy will be directed into the specimen. By observing the manner in which this ultrasonic energy travels through the specimen and/or is internally reflected, various characteristics such as the presence of internal flaws, dimensions, etc. may be determined.

Normally, the mechanically vibratable member in the transducer is a piezo-electric member such as a quartz crystal having a radiating surface which mechanically vibrates when an alternating electrical signal is applied thereto. The mechanical vibrations of this surface cause corresponding vibrations to be coupled into the surrounding medium so as to travel therethrough as a beam of ultrasonic energy. The pattern of the beam and the manner in which the energy is distributed within the beam is determined by a wide variety of factors such as the size and shape of the surface of the crystal, the frequency of the energy and the distance from the crystal. Heretofore, the energy from a transducer has been radiated in a predetermined fixed pattern that could not be readily varied. Although the radiation pattern for any given transducer may be particularly well-suited for certain types of observations, it is not well-suited for other types of observations. For example, if the transducer radiates a broad beam it is extremely difficult, if not impossible, to detect small internal flaws, particularly those flaws located within the near field region. Conversely, if the transducer radiates a very narrow beam it is extremely difficult, if not impossible, to rapidly search large areas. As a consequence, heretofore it has been necessary to select a transducer that radiates a beam especially adapted to the particular operation being performed. If the operation to be performed is changed, it has been necessary to change the transducer. This necessitates a large inventory of transducers and the loss of time in replacing transducers each time the operation changes. It will thus be seen that the transducers employed heretofore have been of limited utility, and have not been entirely satisfactory for performing a wide variety of measurements, tests and/or observations.

The present invention provides means for overcoming the foregoing difficulties. More particularly, the present invention provides a transducer for producing ultrasonic energy having means for adjustably focusing the ultrasonic energy into a beam having a pattern that is particularly well-suited to the particular operation being performed. As a result a single ultrasonic transducer may now be employed for performing a wide variety of operations without replacing the transducer.

In the single operative embodiment of the present invention disclosed herein, a transducer is provided that has a piezoelectric crystal capable of mechanically vibrating at an ultrasonic frequency and radiating ultrasonic energy of that frequency from a radiating surface and along a predetermined path. A deformable medium that is transparent to ultrasonic energy and has a predetermined acoustical velocity is disposed in line with the radiating surface on the crystal. Means are provided for changing the shape of the deformable medium over a wide range of shapes. The deformable medium will thereby be effective to act as a lense and focus the ultrasonic energy passing therethrough. By varying the shape of the deformable medium, the ultrasonic energy radiated from the transducer may be focused into a beam that is best suited for the particular operation being performed.

These and other features and advantages of the present invention will become readily apparent from the following detailed description of one operative embodiment thereof, particularly when taken in connection with the accompanying drawings wherein like reference numerals refer to like parts and wherein.

Figure 1:
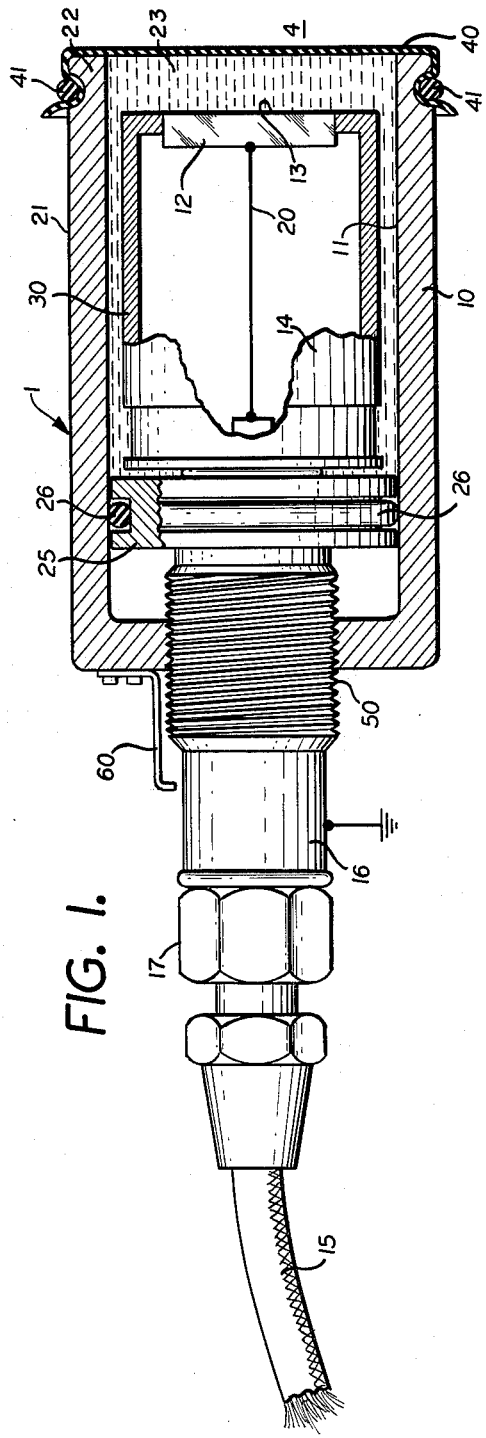
FIGURE 1 is a side view of a transducer embodying one form of the present invention, with portions thereof being broken away.
Figure 3:
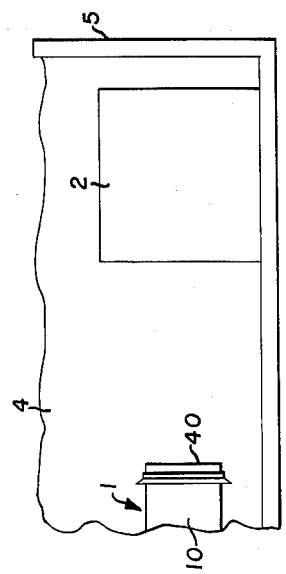
FIGURE 3 is a fragmentary side view of a transducer and workpiece.

Referring to the drawings in more detail, the present invention is particularly adapted to be embodied in a transducer 1 for generating and radiating ultrasonic energy for use in ultrasonically testing, inspecting and/or measuring various characteristics of a material in a test specimen 2.

The transducer 1 includes a member that is adapted to mechanically vibrate at the desired ultrasonic frequency. Although any type of vibrating member may be employed, it is customarily a piezoelectric member such as a quartz crystal 12. A crystal 12 of this nature is normally a relatively flat member having a generally planar radiating surface 13. When an electrical signal of a suitable frequency is applied to the crystal 12, the crystal 12 will mechanically vibrate and radiate mechanical vibrations from the surface 13. These vibrations may be transferred into the test specimen 2 by immersing the transducer and specimen 2 into a coupling medium 4 such as water.

The present crystal 12 is mounted in a suitable holder 14 whereby the radiating surface 13 is exposed and positioned to radiate ultrasonic energy along a path normal to the surface 13. The holder 14 may include a substantially cylindrical barrel 30 and a projection as reduced neck 16 that extends from the end most remote from the crystal 12.

A coupling 17 may be provided on the end of the neck 16 for receiving an electrically conductive cable such as a coaxial cable 15. The cable 15 may be interconnected with a signal source such as an oscillator. The oscillator will produce electrical signals of the desired ultrasonic frequency and feed them onto the cable 15. The crystal 12 may be electrically connected to the cable 15 by means of an electrical conductor 20 that extend axially of the holder 14..

It may thus be seen that the crystal 12 may be electrically interconnected with a source of electrical signals having frequencies that are in the ultrasonic region. These signals which may be continuous or pulses of short duration will excite the crystal 12 and cause ultrasonic energy to be radiated from the surface 13. This energy will normally be radiated along a path which is substantially normal to the surface 13. The energy will be radiated in a pattern having well known characteristics similar to those shown in the graph of FIGURE 2A. More particularly, in the near field region the energy will be distributed between a primary lobe 70 and one or more secondary lobes 71 and 72. As the distance from the crystal 12 increases the percentage of energy in the primary lobe 70 will increase and the energy in the secondary lobes 71 and 72 will decrease. However, the size and width of the primary lobe 70 will also increase.

A beam of this nature is well-suited for many types of operations. As a result, by a proper choice of crystals a radiated beam can be produced that best suits a particular operation. However, such a beam is not suitable for some types of operations such as searching for small internal flaws in a test specimen and located within the near field region.

In order to overcome these difficulties, means are provided for forming the radiated energy into a beam having characteristics best suited for the particular operation being performed. In the present instance, this is accomplished by providing a deformable medium 23 in line with the path of the ultrasonic energy. This medium 23 is transparent to ultrasonic energy whereby the energy radiated from the surface 13 of the crystal 12 may be propagated therethrough.

In the present instance this medium 23 is disposed inside of an outer casing 10 having a cylindrical barrel 21 that surrounds the crystal holder 14. The outer casing 10 may also include an end wall that is internally threaded to coact with threads 50 on the outside of the reduced neck 16. As a result by rotating the casing 10, the casing 10 may be moved axially along the crystal holder 14.

Flange 25 projects outwardly from the neck 16 so as to slideably engage the cylindrical surface on the inside of the barrel 21. This flange 25 will support the casing 10 as it is moved axially along the crystal holder 14. A sealing member such as a resilient or pliable O ring 26 may be seated on the flange 25 so as to seal the space between the flange 25 and casing 10.

It may thus be seen that the holder 14, crystal 12 and O ring 26 form a piston and when the casing 10 rotates on the threads 50 the resultant axial movement of holder 14 and casing 10 will "pump" the deformable medium axially of the casing 10.

The second end 22 of the casing 10 is open and is positioned in line with the crystal 12. As a result the ultrasonic energy radiated from the crystal 12 may pass through this open end 22. In order to control this energy and distribute it into a beam of desired characteristics, the deformable medium may be disposed in the open end 22 of the barrel 21 in line with the path followed by the radiated energy. Although any type of deformable medium may be employed, in the present instance it is a liquid 23 that is transparent to ultrasonic energy and has a preselected acoustical velocity at which the energy will propagate therethrough. The liquid 23 may be confined in a space aligned with the radiating surface 13 of the crystal 12 by means of a flexible member. By way of example in the present instance, a flexible diaphragm 40 is secured across the open end of the barrel by means of a clamp or O ring 41.

It may be seen that the deformable medium or liquid 23 will have a surface in intimate contact with the active surface 13 of the transducer. The opposite side of the liquid 23 will have a surface that is defined by the shape of the flexible member or diaphragm 40. As a result by varying the shape of the diaphragm 40, the second surface of the deformable liquid 23 will be varied.

Figure 2A:
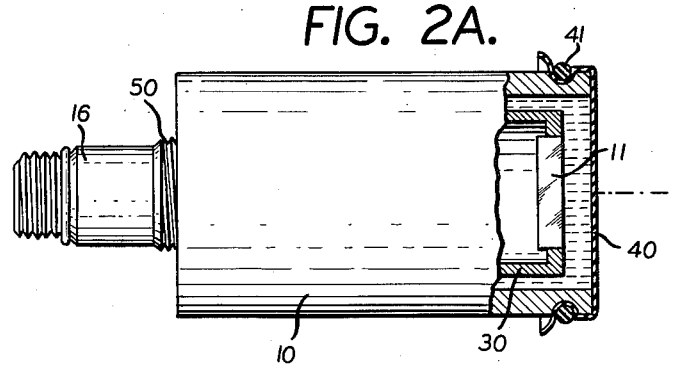
FIGURES 2A, 2B and 2C are a series of side views similar to FIGURE 1, but showing the transducer disposed in a series of different operating adjustments together with graphs illustrating the distribution of the energy in the beams radiated from the transducer.
Figure 2A:
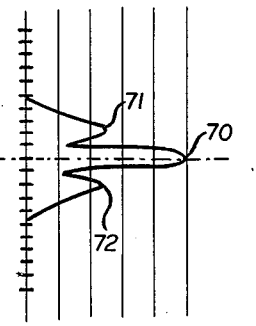

In the present instance, the volume of liquid disposed inside of the casing 10 is fixed. As a result, if the casing 10 is rotated about the crystal holder 14, the casing 10 will move axially along the thread 50 and the piston formed by the flange 25 and O ring 41 will displace the liquid 23. At one particular location, the free volume inside of the barrel 21 will just equal the volume of the liquid 23. This condition is illustrated in FIGURE 2A, and the diaphragm 40 is parallel to the radiating surface 13. As a consequence the liquid is of uniform thickness and has two plane sides that are parallel.

If the casing 10 is threaded further onto the crystal holder 14 the volume available inside of the barrel 21 for the liquid 23 will decrease. The liquid 23 will then be displaced and the diaphragm 40 will be bowed outwardly similar to FIGURE 2B. This will cause the outer surface of the liquid 23 to have a convex surface. Conversely, if the casing 10 is threaded off of the crystal holder 14 the volume available inside of the barrel 21 for the liquid 23 will increase above the amount of liquid. The diaphragm 40 will then be forced inwardly similar to FIGURE 2C. This will cause the outer surface of the liquid 23 to have a concave surface.

In order to employ the present transducer 1 for inspecting, testing and/or measuring one or more characteristics of a test specimen 2, the crystal 12 is interconnected with a source of electrical signals, for example, an oscillator, by means of the coaxial cable 15. These electrical signals will excite the crystal 12 into mechanical vibrations. The transducer may then be immersed into a tank 5 containing the coupling liquid 4 such as water and positioned adjacent to the specimen 2 to be inspected, tested and/or measured.

As the resultant ultrasonic energy is radiated from the surface 13 of the crystal 12 it will first travel through deformable medium, i.e., the first liquid 23, through the diaphragm 40 and then into the coupling or second liquid 4, and thence into the test specimen 2.

The velocity at which the ultrasonic energy propagates through the first liquid 23 is preferably substantially different from the velocity at which it propagates through the second liquid 4. In the event that the diaphragm 40 is substantially parallel to the radiating surface 13 of the crystal 12 as shown in FIGURE 2A, the ultrasonic energy will strike all of the liquid surfaces and the diaphrgam 40 at substantially right angles. As a result, the shape or pattern of the ultrasonic beam will not be materially altered as it travels from the first liquid 23, through the diaphragm 40 and into the second liquid 4.

Normally, the intensity of this energy will vary transversely of the beam similar to the curve in the graph of FIGURE 2A. More particularly, in the near field region the beam will have a central lobe 70 of large intensity. In addition, one or more secondary lobes 71 and 72 of lesser intensity will surround the center lobe 70.

As the distance from the crystal 12 increases beyond the near field region, the secondary lobes 71 and 72 will tend to disappear and the intensity of the primary lobe 70 will increase. However, the cross-sectional area of the lobe 70 increases as the distance from the crystal 12 increases.

For some types of observations, a beam of the foregoing characteristic will be desirable. However, under other circumstances it may be found desirable to employ a beam having a large cross-sectional area in the near field region. For example, if it is desired to rapidly scan large areas of the test specimen 2 close to its surface, it may be desirable to have a broad beam of nearly uniform intensity.

Figure 2B:
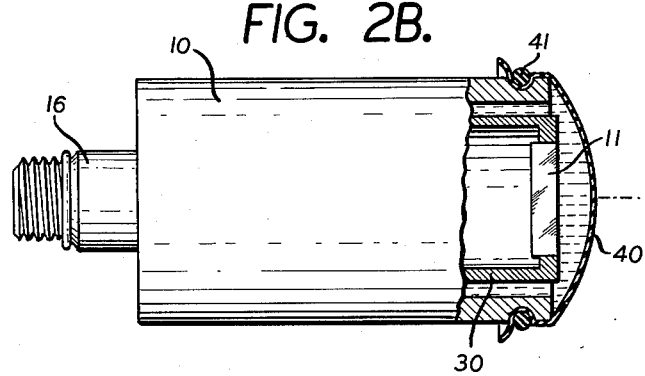
Figure 2B:
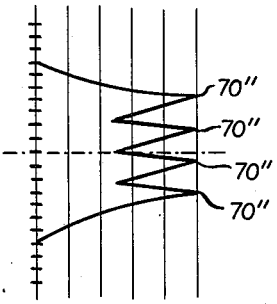
Figure 2C:
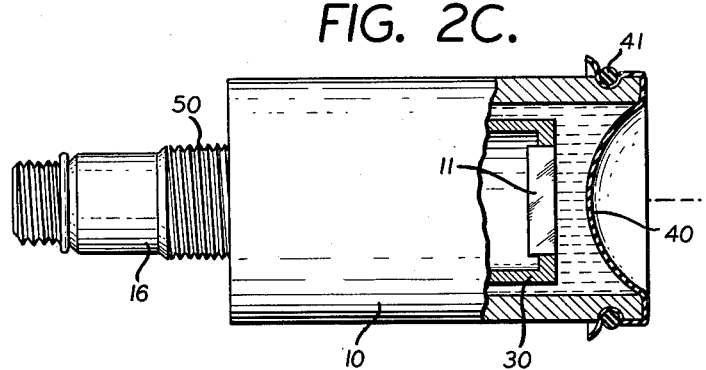
Figure 2C:
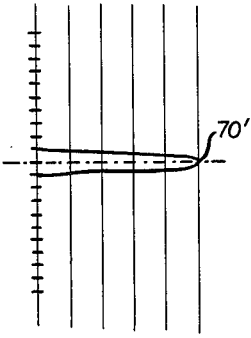

In order to obtain a beam of this character the outer casing 10 may be rotated so as to move axially along the threads 50 into a position similar to that of FIGURE 2B. This will be effective to reduce the volume available inside of the barrel 21. A larger volume of the liquid 23 will then be forced to flow into the space between the radiating surface 13 on the crystal 12 and the diaphragm 40. As a consequence, the diaphragm 40 will bulge outwardly.

The liquid 23 will now have a plane inner face and a convex outer face 24. As previously stated the velocity at which the ultrasonic energy travels through the first liquid 23 is materially different from the corresponding velocity in the second liquid 4. By way of example, if the second or coupling liquid 4 is water with an acoustical velocity of $1.5 \times 10^5$ cm./sec. the first liquid 23 may be glycerine with an acoustical velocity of $1.9 \times 10^5$ cm./sec.

The ultrasonic energy will strike the interface between the first and second liquids at a wide variety of angles. The energy passing axially through the center of the liquid 23 will strike the interface at or near right angles. However, the energy passing through the peripheral regions of the interface will be incident on the interface as an angle that materially differs from a right angle.

As a result of the differences in the acoustical velocities of the two liquids, the variations in the angles of incidences will cause the energy to be arranged into a beam wherein the energy is distributed in a pattern similar to the graph in FIGURE 2B. More particularly, the beam includes a series of lobes 70" of substantially identical amplitudes. The beam will thus have a broad cross-sectional area with the intensity of the energy being more nearly uniform in all parts.

Under other circumstances it may be desirable to employ a beam of very narrow cross-sectional area and high intensity, for example, to locate small flaws located in the near field. Under these circumstances the outer casing 10 may be rotated so as to move the casing 10 axially into a position similar to that of FIGURE 2C.

The volume inside of the casing 10 available for the liquid 23 will be increased and the amount of liquid between the crystal 12 and the diaphragm 40 will be decreased. The diaphragm 40 will now be forced inwardly so that the first liquid 23 will have a concave face 27. Due to the differences in the acoustical velocities of the two liquids 4 and 23, substantially all of the energy passing through the interface between the two liquids will be concentrated into a primary lobe 70' that is very narrow.

It may thus be seen that by rotating the outer casing 10 until the pointer 60 carried by the casing 10 registers with the desired indicia on the neck 60, the interface between the first and second liquids 4 and 23 may be given a shape that will provide an ultrasonic beam of the desired configuration.

While only a single embodiment of the present invention is disclosed and described herein, it will be readily apparent to persons skilled in the art that numerous changes and modifications may be made thereto without departing from the spirit of the invention. For example, the deformable medium 19 may be other than a liquid. Also, the shape of the deformable medium 19 may be varied by any suitable means. Accordingly, the foregoing disclosure, including the drawings and description thereof, are for illustrative purposes only and do not in any way limit the invention which is defined only by the claims which follow.

I claim:
1. A liquid lens ultrasonic beam controlling device comprising
   a casing adapted to be immersed in a liquid medium providing an ultrasonic energy coupling path to a test object, said casing having an open end,
   a flexible diaphragm closing said open end,
   an ultrasonic transducer supported in said casing so as to transmit ultrasonic vibrations toward said diaphragm,
   a liquid filling the interior of the casing and having an acoustical velocity that differs substantially from the acoustic velocity of the liquid in which the casing is immersed, said casing being positioned so that said diaphragm is spaced from the test object, and
   means for varying the pressure on said liquid within the casing through a continuous range including a value above and a value below the pressure of the liquid in which the casing is immersed to force the diaphragm outwardly or draw it inwardly to provide a lens capable of continuous variation from convex to concave.

2. A liquid lens ultrasonic beam controlling device comprising
   a casing adapted to be immersed in a liquid medium providing an ultrasonic energy coupling path to a test object, said casing having an open end,
   a flexible diaphragm closing said open end,
   a piston movable within the casing toward and away from the diaphragm, and
   an ultrasonic transducer carried by the piston so as to transmit ultrasonic vibrations toward said diaphragm, the space between the piston and the diaphragm being filled with liquid whereby movement of the piston toward the diaphragm will increase the liquid pressure within the casing to a value above the liquid pressure outside the casing to thereby cause the diaphragm to be distended outwardly to form a convex lens and movement of the piston away from the diaphragm will decrease the liquid pressure within the casing to a value below the liquid pressure outside the casing to thereby cause the diaphragm to be bowed inwardly to form a concave lens,
   the liquid within the casing having a substantially different acoustic velocity from the liquid in which the casing is immersed, said casing being positioned so that said diaphragm is spaced from the test object.

3. A liquid lens ultrasonic beam controlling device comprising
   a casing adapted to be immersed in a liquid medium providing an ultrasonic energy coupling path to a test object, said casing having an open end,
   a flexible diaphragm closing said open end,
   an ultrasonic transducer supported in said casing so as to transmit ultrasonic vibrations toward said diaphragm, the interior of the casing being filled with liquid,
   the liquid within the casing having a substantially different acoustic velocity from the liquid in which the casing is immersed, said casing being positioned so that said diaphragm is spaced from the test object, and
   means for varying the pressure on said liquid within the casing through a continuous range including a value above and a value below the pressure of the liquid in which the casing is immersed to force the diaphragm outwardly or draw it inwardly to provide a lens capable of continuous variation from convex to concave.

4. A liquid lens ultrasonic beam controlling device comprising
   a casing having an open end,
   a flexible diaphragm closing said open end,
   a member mounted on the casing for movement in first and second directions,
   an ultrasonic transducer disposed in the casing so as to transmit ultrasonic vibrations toward said diaphragm, and
   the space between the transducer and the diaphragm being filled with liquid whereby movement of the member in the first direction will increase the liquid pressure within the casing and distend the diaphragm outwardly to form a convex lens and movement of the member in the second direction will cause the diaphragm to be bowed inwardly and form a concave lens.

5. A transducer of the class described including the combination of means for radiating ultrasonic energy along a predetermined path;
a member positioned adjacent said means and having a deformable portion disposed in said path, said deformable portion of said member being transparent to said energy, and forming a lens to said energy, and
means for deforming said portion and vary the ultrasonic lens characteristics of said portion.

6. An ultrasonic transducer for being immersed in a first fluid, said transducer including the combination of,
an ultrasonic member having a radiating surface, said surface being effective to radiate ultrasonic energy along a predetermined path,
a second fluid disposed across said surface and arranged to form an interface between the two fluids on said path, said second fluid having an acoustical velocity for propagating ultrasonic energy that differs from the acoustical velocity of the first fluid, and
means to deform the shape of the interface.

7. An ultrasonic transducer for being immersed in a first fluid, said transducer including the combination of,
an ultrasonic member,
a radiating surface on said member effective to radiate ultrasonic energy along a predetermined path,
a deformable member having a portion thereof spaced from said radiating surface and disposed in the path of said energy,
a second fluid disposed between said portion and said surface, said second fluid having an acoustical velocity at which ultrasonic energy is propagated that differs from the acoustical velocity of the first fluid, and
means to vary the volume of the second fluid between the deformable member and the radiating surface.

8. An ultrasonic transducer for being immersed in a first fluid, said transducer including the combination of,
an ultrasonic member having a radiating surface effective to radiate ultrasonic energy along a predetermined path,
a deformable member having a portion thereof spaced from said surface and disposed in the path of said energy,
a second fluid disposed between said portion and said surface, said second fluid having an acoustical velocity at which ultrasonic energy is propagated that differs from the velocity of the first fluid, and
means to deform the shape of the portion of said deformable member in the path of said energy.

9. An ultrasonic transducer for being immersed in a fluid having a first acoustical velocity at which ultrasonic energy travels, said transducer including
an ultrasonic member effective to mechanically vibrate at an ultrasonic frequency,
a radiating surface on said member effective to radiate ultrasonic vibrations along a predetermined path when said member vibrates,
a lens medium disposed between said surface and said fluid, said medium having a second acoustical velocity at which ultrasonic energy travels, said first and second acoustical velocities differing from each other, and
means for changing the shape of the portion of the lens medium aligned with said surface and in said path.

10. An ultrasonic transducer for being immersed in a fluid having a first acoustical velocity, said transducer including
an ultrasonic member effective to mechanically vibrate at an ultrasonic frequency,
a radiating surface on said member effective to radiate ultrasonic vibrations along a predetermined path when said member vibrates,
a deformable lens medium disposed between said surface and said fluid, said medium having an acoustical velocity at which ultrasonic energy propagates that differs from the acoustical velocity of the fluid and,
means for applying a deforming force to the portion of said medium aligned with said radiating surface and in said path.

11. An ultrasonic transducer for being immersed in a first fluid, said transducer including the combination of
a support,
an ultrasonic member mounted on said support and having a radiating surface effective to radiate ultrasonic energy along a predetermined path,
a casing disposed around the support and having an open end aligned with the surface and surrounding said path,
a deformable member having a portion disposed across said end and spaced from the surface,
a second fluid disposed inside of the casing and filling the space between the surface and the deformable member, said second fluid having an acoustical velocity at which ultrasonic energy propagates that differs from the acoustical velocity of the first fluid, and
means for deforming said portion and the shape of the fluid between the surface and the deformable member.

12. An ultrasonic transducer for being immersed in a first fluid, said transducer including the combination of
a crystal support,
a piezoelectric crystal mounted on said support and having a surface effective to radiate ultrasonic energy along a predetermined path,
an outer casing disposed around the crystal support and having an open end aligned with the surface and surrounding said path, said casing being movably mounted on said support,
a deformable member having a portion disposed across said end and spaced from the surface,
a second fluid disposed inside of the casing and filling the space between the surface and the deformable member, said second fluid having an acoustical velocity at which ultrasonic energy propagates that differs from the acoustical velocity of the first fluid, and
means for moving the casing relative to the crystal support to vary the volume of the second fluid between the surface and the deformable member.

References Cited by the Examiner
UNITED STATES PATENTS

| 2,300,251 | 10/1942 | Flint | 340—8 |
| 2,420,676 | 5/1947 | Peterson | 340—8 |
| 2,913,602 | 11/1959 | Joy | 340—8 |
| 2,972,068 | 2/1961 | Howry et al. | 340—8 |

ORIS L. RADER, *Primary Examiner.*
JOHN F. COUCH, *Examiner.*
A. J. ROSSI, *Assistant Examiner.*